(12) United States Patent
Cao et al.

(10) Patent No.: US 8,408,039 B2
(45) Date of Patent: Apr. 2, 2013

(54) MICROFORMING METHOD AND APPARATUS

(75) Inventors: Jian Cao, Wilmette, IL (US); Anthony Swanson, Chicago, IL (US); Tiffany Davis, Chicago, IL (US)

(73) Assignee: Northwestern University, Evanston, IL (US)

( * ) Notice: Subject to any disclaimer, the term of this patent is extended or adjusted under 35 U.S.C. 154(b) by 637 days.

(21) Appl. No.: 12/587,408

(22) Filed: Oct. 6, 2009

(65) Prior Publication Data

US 2010/0092796 A1    Apr. 15, 2010

Related U.S. Application Data

(60) Provisional application No. 61/195,442, filed on Oct. 7, 2008.

(51) Int. Cl.
*B21J 11/00*     (2006.01)
*B21D 5/06*      (2006.01)
*B21B 27/06*     (2006.01)

(52) U.S. Cl. ............. 72/418; 72/446; 72/455; 72/379.2; 72/404; 72/414; 72/462

(58) Field of Classification Search .................... 72/297, 72/43, 69, 75, 115, 122, 124, 125, 305, 311, 72/350, 404, 418, 421, 429, 430, 446, 447, 72/455, 462, 707
See application file for complete search history.

(56) References Cited

U.S. PATENT DOCUMENTS

| | | | |
|---|---|---|---|
| 4,959,275 A * | 9/1990 | Iguchi et al. | 428/603 |
| 5,140,879 A | 8/1992 | Haj-Ali-Ahmadi et al. | 83/39 |
| 5,508,119 A * | 4/1996 | Sheu et al. | 72/199 |
| 5,896,643 A * | 4/1999 | Tanaka | 72/462 |
| 5,952,080 A | 9/1999 | Etsion et al. | 428/156 |
| 6,091,047 A | 7/2000 | Miyakawa et al. | 219/121.68 |
| 6,153,316 A * | 11/2000 | Shannon | 72/700 |
| 6,216,508 B1 * | 4/2001 | Matsubara et al. | 72/43 |
| 6,233,989 B1 * | 5/2001 | Blinstrubas | 72/55 |
| 6,532,786 B1 * | 3/2003 | Luttgeharm | 72/115 |
| 6,561,002 B2 * | 5/2003 | Okada et al. | 72/115 |
| 6,971,256 B2 * | 12/2005 | Okada et al. | 72/69 |
| 7,467,535 B2 * | 12/2008 | Kuno et al. | 72/446 |
| 7,536,892 B2 * | 5/2009 | Amino et al. | 72/305 |
| 7,971,463 B2 * | 7/2011 | Forrest et al. | 72/67 |
| 8,033,151 B2 * | 10/2011 | Castle et al. | 72/53 |
| 2002/0114265 A1 | 8/2002 | Hart, III et al. | 369/275.5 |
| 2004/0148997 A1 * | 8/2004 | Amino et al. | 72/297 |

FOREIGN PATENT DOCUMENTS

EP    1598138    11/2005

OTHER PUBLICATIONS

Wang, C.J., Surface Topography Control in Single-Point Cutting, S.M. Wu Symposium, 1994, 1.
Yao, D. and P. Nagarajan, Cold Forging Method for Polymer Microfabrication, Polymer Engineering and Science, 2004, 44(10), pp. 1998-2004.
Rode, M. and B. Hillerich, Self-Aligned Positioning of Microoptical Components by Precision Prismatic Grooves Impressed into Metals, IEEE Journal of Microelectromechanical Systems, 1999, 8(1), pp. 58-64.

(Continued)

*Primary Examiner* — David B Jones

(57) ABSTRACT

Method of forming depressions (e.g. dimples) in a sheet material to form a textured surface thereon involves pressing one or more tool tips into a metallic or non-metallic sheet material while the sheet material is supported by a support layer that is relatively softer (e.g. having a lower Young's modulus) than the sheet material so as to allow plastic deformation and reduce pile-up of raised displaced material of the sheet material at the edges of the depressions.

22 Claims, 4 Drawing Sheets

OTHER PUBLICATIONS

Chou, M.-C., et al., A novel method to fabricate gapless hexagonal micro-lens array, Sensors and Actuators A: Physical, 2005, 118(2), pp. 298-306.

Böhm, J., et al., Micro-metalforming with silicon dies, Microsystem Technologies, 2001, 7(4), pp. 191-195.

Pettersson, U. and S. Jacobson, Influence of surface texture on boundary lubricated sliding contacts, Tribology International, 2003, 36(11), pp. 857-864.

Wang, X., et al., Loads carrying cappcity map for the surface texture design of SiC thrust bearing sliding in water, Tribology International, 2003, 36 (3), pp. 189-197.

Kim, G.M, et al., Fabrication and application of a full wafer size micro/nanostencil for multiple length-scale surface patterning, Microelectronic Engineering, 2003, 67-68, pp. 609-614.

Smuokov, S.K., et al., Cutting into Solids with micropatterned Gels Advanced Materials, 2005, 17, pp. 1361-1365.

Ryk, G., et al., Experimental Investigation of Laser Surface Texturing for Reciprocating Automotive Components, Tribology Transactions, 2002, 45(4), pp. 444-449.

Etsion, i., et al., A Laser Surface Textured Hydrostatic Mechanical Seal, Tribology Transactions, 2002, 45(3), pp. 430-434.

Brizmer, V., et al., a Laser Surface Textured Parallel Thrust Bearing, Tribology Transactions, 2003, 46(3), pp. 397-403.

Etsion, I., State of the Art in Laser Surface Texturing, Journal of Tribology, 2005, 127(1), pp. 248-253.

Geiger, M., et al., Excimer laser micro texturing of cold forging tool surfaces—Influence on tool life, Cirp Annals-Manufactuing Technology, 2002, 51(1), pp. 231-234.

Baumgart, P., et al., A new laser texturing technique for high performance magnetic disk drives, IEEE Transactions on Magnetics, 1995, 31(6), pp. 2946-2951.

\* cited by examiner

MICROFORMING METHOD AND APPARATUS

This application claims priority and benefits of U.S. provisional application Ser. No. 61/195,442 filed Oct. 7, 2008, the disclosure of which is incorporated herein by reference.

FIELD OF THE INVENTION

This invention relates to method and apparatus for rapidly and accurately creating micro-textured surfaces on sheet material using one or more tool tips pressed into the sheet material.

BACKGROUND OF THE INVENTION

Currently, surface texturing is done via machining, embossing, chemical etching, or laser ablation. Machining entails removal of material from a substrate to leave a desired geometry. One example surface texture creation by micromachining is the use of a turning operation along with a micro-positioning system [1]. This method allows for accurate shapes and tolerances, but is fairly time consuming and expensive. It could also results in an undesirable residual stress in the workpiece.

Embossing techniques use dies to plastically deform the surface of the material, creating an array of surface features with one punching action. This method is widely used, though the material choices are generally limited to polymers and ductile metals and die wear can be a problem [2-5]. The embossing die is usually made through a chemical etching technique.

Chemical etching involves time-consuming steps, including the use of an etching mask placed directly on the specimen so that the surface can be selectively etched via etching chemicals. Since the mask is generally consumed during the etching step, a new mask must be created for each sample to be textured. This technique is widely used in the laboratory [6, 7], though it is somewhat impractical for industrial applications. Recently, several methods have been developed where the etching mask may be re-used, thereby increasing the efficiency of the process [8, 9].

Laser surface texturing techniques have become popular because they can achieve submicron-sized features in hardened metallic surfaces with highly variable geometries. Recently, this method has been used on a variety of automotive components, mechanical seals, and bearings [10-15]. Laser texturing has also been used to overcome stiction problems with hard disk drives [16, 17]. However, laser texturing does not allow for accurate control over the resulting dimple geometry, and the surface finish is generally poor [18] if a fast process is desired.

SUMMARY OF THE INVENTION

The present invention provides a method of forming depressions (e.g. dimples) in a sheet material to form a textured surface thereon. An embodiment of the present invention involves pressing one or more tool tips into a metallic or non-metallic sheet material while the sheet material is supported by a support layer that is relatively softer (e.g. having a lower Young's modulus) than the sheet material to allow plastic deformation of the sheet material and reduce pile-up of raised displaced material of the sheet material at the edges of the depressions. The one or more tool tips and the sheet material are relatively moved toward one another to press the tool tips into the sheet material.

The method can be practiced using single or multiple tool tips to texture the sheet surface. For example, a single tool tip and the sheet material can be relatively laterally moved after each pressing step to form a pattern of depressions at various programmed locations on the sheet material. Alternatively, the method can be practiced by pressing a plurality of tool tips arranged in a two dimensional pattern into the sheet material to simultaneously form a similar pattern of depressions in the sheet material.

In an illustrative embodiment of the invention, a metallic sheet material can have a thickness in the range of about 50 micrometers to about 1.5 mm, although the sheet thickness is dependent on the depth to which the sheet material is to be textured by depressions. The method can be practiced to form one or more depressions having a lateral dimension (e.g. diameter or width) of about 1 micrometer to about several millimeters (e.g. 10 mm) and a depth of 1 micrometer to several millimeters (e.g. 5 mm). For purposes of illustration and not limitation, the support layer can comprise a metallic or non-metallic (e.g. plastic) layer having a Young's modulus that is 5% to 20% of the Young's modulus of the sheet material, such as preferably 10% of that of the metallic sheet material.

The present invention is advantageous to provide a microforming method that can be practiced at room temperature without the need for heating of the tool tip(s)/sheet material and is significantly faster and less expensive than chemical etching or machining, while imparting dimensions with higher tolerance than laser texturing provides. The method of the present invention eliminates the need to use etching to create a die and instead displaces material with one or more precision tool tips, creating a substantially smooth final surface very quickly.

Other advantages of the present invention will become more readily apparent from the following description taken with the following drawings.

DESCRIPTION OF THE INVENTION

Figure 1:
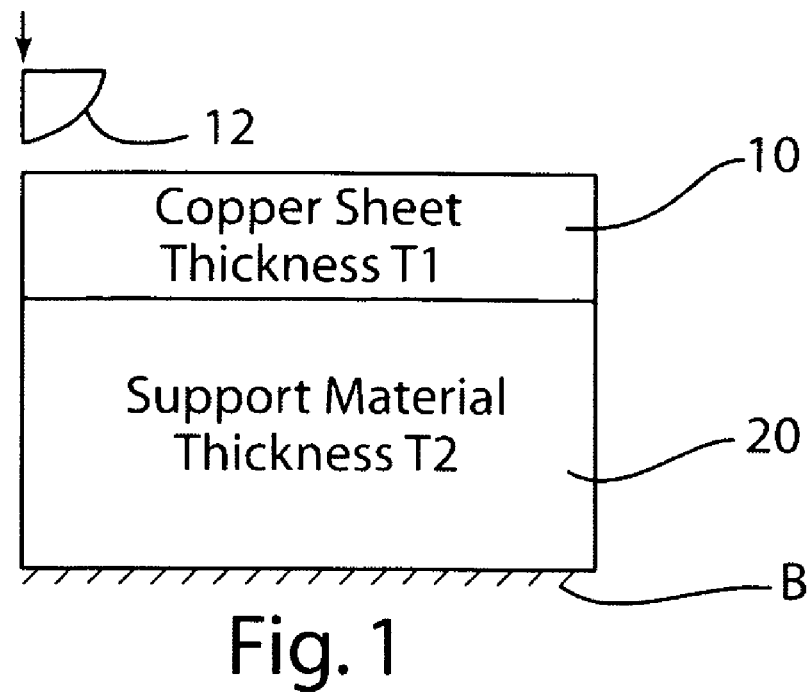
FIG. 1 provides a schematic two-dimensional representation of a compression apparatus and method for forming depressions (e.g. dimples) in a sufficiently ductile sheet material to form a texture on the upwardly facing surface thereof while the downwardly facing surface of the sheet material resides on a softer support layer on a machine base.

For purposes of illustration and not limitation, FIG. 1 provides a schematic two-dimensional representation of a compression apparatus and method for forming depressions (e.g. dimples) in a sheet material 10 to form a dimpled texture on the 10*s* surface thereof. An embodiment of the present invention involves pressing one or more tool tips 12 (one shown in FIG. 1) into surface 10*s* of the sheet material 10 while the sheet material is supported below on its back side 10*b* by a support layer 20 that is relatively softer (e.g. having a lower Young's modulus) than the sheet material 10. The support layer 20 is disposed on a rigid base B of the compression apparatus. The one or more tool tips 12 and the sheet material 10 are relatively moved toward one another to press the tool tips into the sheet material.

The sheet material 10 can comprise a metallic sheet or a non-metallic sheet which has sufficiently high ductility that it can undergo plastic deformation rather than fracture when deformed by the tool tip 12. For purposes of illustration and not limitation, metallic sheet material can include, but is not limited to, copper, copper alloys, aluminum, aluminum alloys, steels, a noble metal, noble metal alloys. A metallic sheet material can have a thickness in the range of about 50 micrometers to about 1.5 mm, although the sheet thickness is dependent on the depth to which the sheet material is to be textured by depressions. The method can be practiced to form one or more depressions in the metallic sheet material having a lateral dimple dimension (e.g. diameter or width) of about 1 micrometer to about several millimeters (e.g. 10 mm) and a dimple depth of 1 micrometer to several millimeters (e.g. 5 mm).

Non-metallic sheet material 10 can include, but is not limited to, a plastic sheet material such as polymeric and other plastics and possibly a sufficiently ductile (non-fracturing) ceramic material.

The support layer 20 can comprise a metallic sheet or a non-metallic sheet which is softer (having a lower Young's modulus) than the sheet material 10. The support layer material and thickness are chosen in dependence on how much deformation is to be imparted to the sheet material residing thereon. For purposes of illustration and not limitation, the support layer 20 can comprise a metallic or non-metallic layer having a Young's modulus that is 5% to 20% of the Young's modulus of the sheet material 10, such as preferably 10% of that of the metallic sheet material.

The thickness of the support layer 20 and its Young's modulus are chosen in relation to the thickness and Young's modulus of the sheet material 10 to allow desired plastic deformation of the sheet material 10 while reducing pile-up of the displaced sheet material at the edges of the depression (where pile-up is displaced sheet material forming a raised ridge, bump or projection at the edges of the depression relative to the original, undeformed plane of the sheet material). For purposes of further illustration and not limitation, a plastic support layer 20 can comprise PMMA polymer layer (Young's modulus=3 GPa) when the sheet material comprises a copper sheet (Young's modulus=115 GPa). A PTFE support layer (Young's modulus=0.46 GPa) may also be used. A metallic support layer 20 can comprise an aluminum layer (Young's modulus=70 GPa) when the sheet material has a higher Young's modulus.

The geometry of the tool tip(s) 12 can be any shape that may be symmetric or non-symmetric. The tool tip(s) can have a selected degree of sharpness which can include an extremely sharp tip as long as the sheet material can sustain that amount of deformation with the assistance of the support material 20. The tool tip(s) typically closely matches closely the geometry of the desired depression (dimple) to be formed in the sheet material 10. However, a large tool tip(s) can be used to create smaller depressions by partially pressing it/them into the sheet material, and a small tool tip(s) can be used to form a larger depression(s) by incrementally moving the tool tip(s) in a prescribed trajectory relative to the sheet material surface 10s to incrementally form a larger depression.

The tool tip(s) 12 can comprise any suitable tool material such as including, but not limited to, diamond, tool steel, steel alloy, tungsten carbide and others that can plastically deform the sheet material 10 when pressed in the sheet surface 10s.

Figure 2:
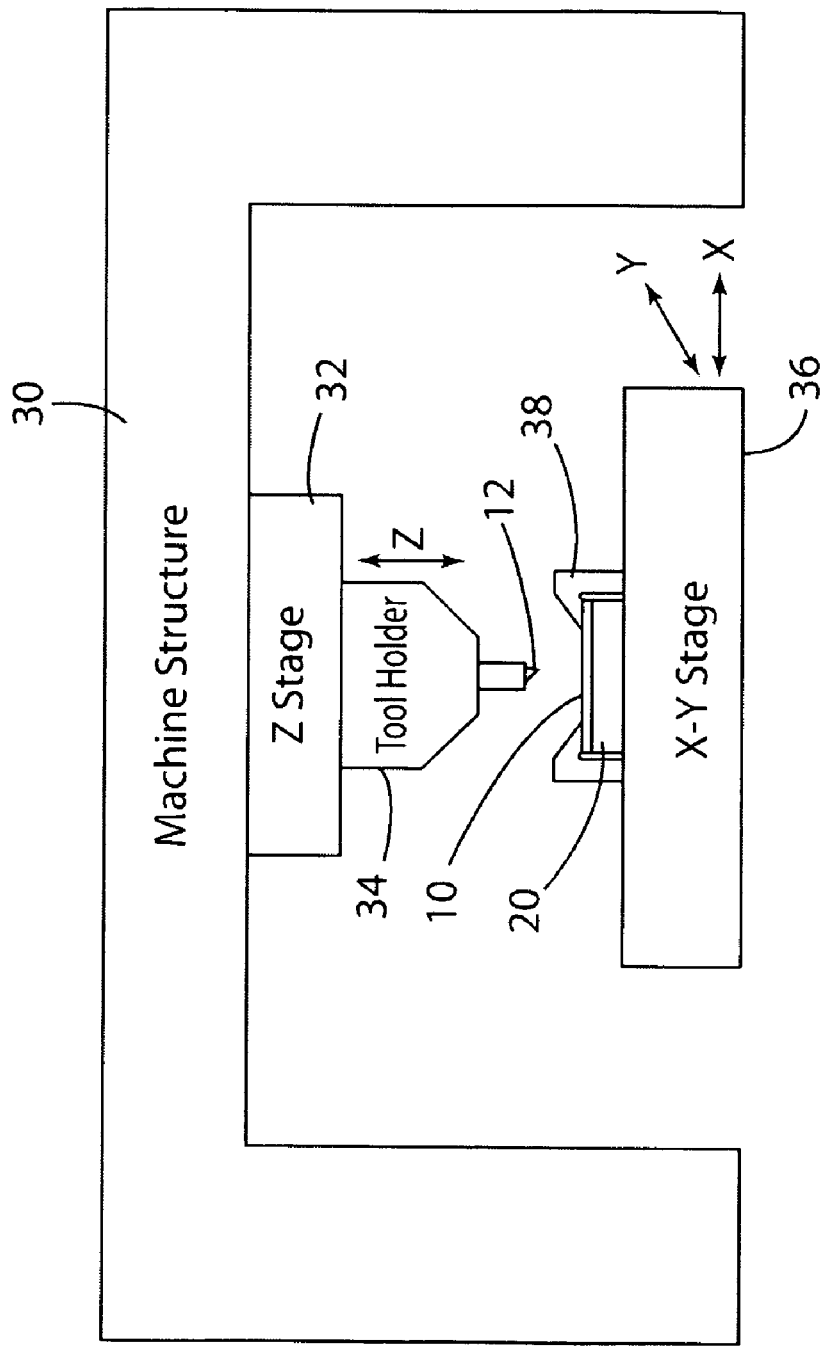
FIG. 2 is a schematic view of a compression machine for practicing an embodiment of the invention.

FIG. 2 illustrates a compression apparatus for practice of an embodiment of the invention wherein after each passing step the tool tip 12 and sheet material 10 are relatively laterally moved to form a depression at another programmed location on the sheet material. A machine frame 30 supports the z-axis stage 32 with a tool holder 34 attached, allowing control of the forming tool tip 12 in the vertical direction (Z direction). The sheet material 10 and underlying support layer 20 are secured in fixed position onto an X and Y positioning stage 36 by a clamping fixture 38. In this apparatus, the tool tip 12 will move only in the Z-direction, while the sheet material 10 will be moved in the X and Y-directions by the stage 36. The tool tip is moved toward the sheet material in the Z direction to press the tool tip into the sheet material. Other alternatives include fixing the sheet material 10 and moving the tool tip 12 in X, Y, and Z directions, or fixing the tool tip 12 and moving the sheet material 10 in all three directions, thereby providing relative movement of the tool tips and the sheet material toward one another for pressing. Thus, the method can be practiced using a single tool tip with the tool tip and the sheet material being relatively moved after each pressing step to form a pattern of depressions at various programmed locations on the sheet material. The tool holder 34 and X-Y stage 36 can be moved directly by or indirectly by drive linkages connected to conventional electric and/or hydraulic motors (not shown) of the compression machine wherein the motors are computer controlled as in a CNC machine to accurately and rapidly position the tool tip(s) at programmed locations on the sheet material 10.

Alternatively, another method embodiment of the invention can be practiced by pressing a plurality of tool tips arranged in a two dimensional pattern into the sheet material to simultaneously form a similar pattern of depressions in the sheet material as described below in the Example. For example, the multiple tool tips can be arranged on a tool holder above the sheet material 10 residing on the support layer 20, both of which are fixed in position on a machine base such that the tool tips are moved in the Z direction to press the tool tips simultaneously into the sheet material to form multiple depressions (dimples) simultaneously.

Figure 3:
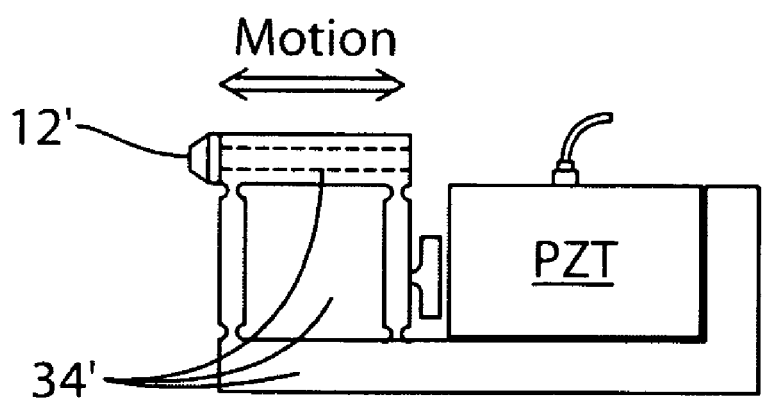
FIG. 3 is a schematic view showing a tool tip(s) mounted on a PZT-actuated vibrating tool holder.

Another alternative machine employs one or more tool tip(s) 12' that can be mounted on a PZT-actuated vibrating tool holder 34' proximate to the sheet material 10 such that vibration of the PZT actuator on tool holder 34' causes pressing of the tool tip(s) into the sheet material, FIG. 3.

The invention can be practiced to form a single pattern or texture of dimples or depressions on the sheet material 10 and also can be practiced to form different patterns or textures of dimples or depressions at different areas of the same sheet material 10 using the above embodiments.

In still another embodiment, the present invention envisions mounting the sheet material as a roll on a cylindrical mandrel via friction or other mounting means (e.g. one or more clamps) and rotating the mandrel to allow the roll of sheet material to be fed into the tool working zone continuously. The mandrel can be provided with another relative movement (e.g. axial mandrel movement) with respect to the tool head to allow the sheet material to be textured along the longitudinal direction of the cylinder (roll). Alternatively, the sheet material on a roll can be moved in a typewriter fashion relative to a fixed tool tip, such as moved side to side and advanced along by the roll, which can also rotate as a typewriter roll does. Different surface texture patterns and geometries can be made like different letters in a typewriter.

EXAMPLE

Rounded Dimples on Sheet Material

Arrays of micro-tool tips were used for the creation of surface texture in thin copper sheets. Hemispherical tool tips of diameter 300 μm were depressed into the copper sheet specimen approximately 150 μm in order to create cup-shaped depressions. A second, more flexible support layer was used underneath the copper sheet to serve as a support and to allow extensive deformation of the sheet material. The choice of the support layer material was dependent upon its ability to minimize bulging of the copper sheet. The thicknesses of the copper sheet and the support material could also be selected to minimize pile up (raised regions) of displaced copper sheet material at the edges of the dimple. To simulate the process, the problem was modeled as a two-dimensional symmetric punching process as illustrated in FIG. 1. The three design variables for the optimization problem were the support layer material (m), the thickness of the copper sheet (Tl), and the thickness of the support material (T2). After numerical simulations, an optimized thickness ratio (Tl/T2) and material selection for the support material were determined.

Physical experiments were performed by pressing steel alloy spheres with average diameters of 365 μm into type 110 alloy copper sheet of thickness 152 μm. A PMMA sheet of thickness 2.54 mm was used as the support layer beneath the copper sheet.

Figure 4:
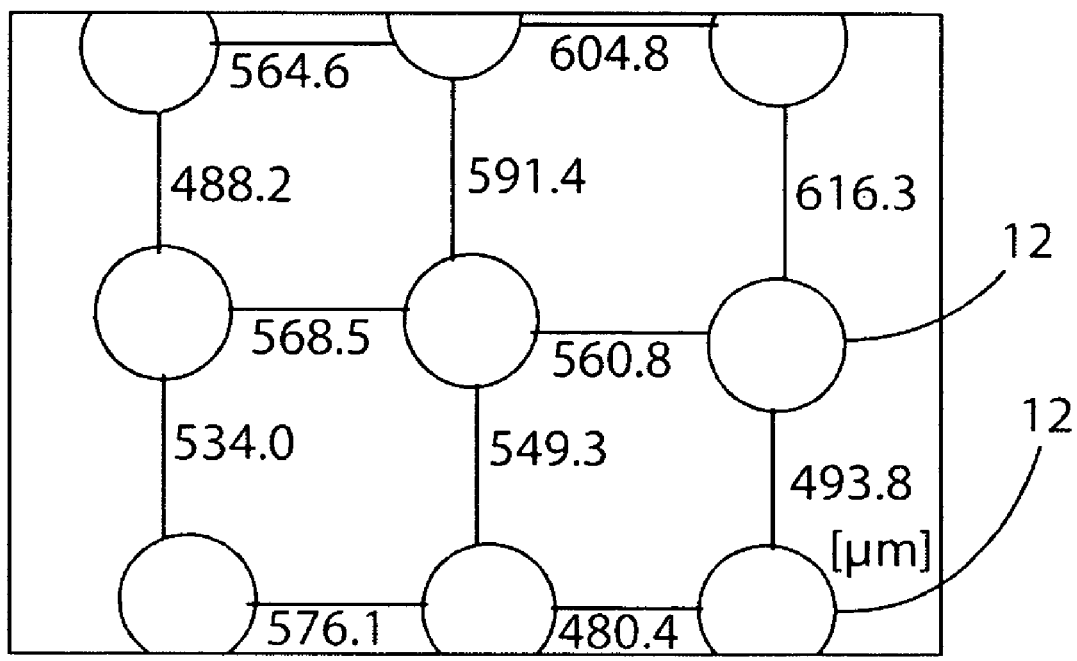
FIG. 4 is a photograph of tool tip spheres arranged in a 7×7 array on a glass slide using vacuum grease as an adhesive. The average distance between adjacent spheres was approximately 550 μm.
Figure 5:
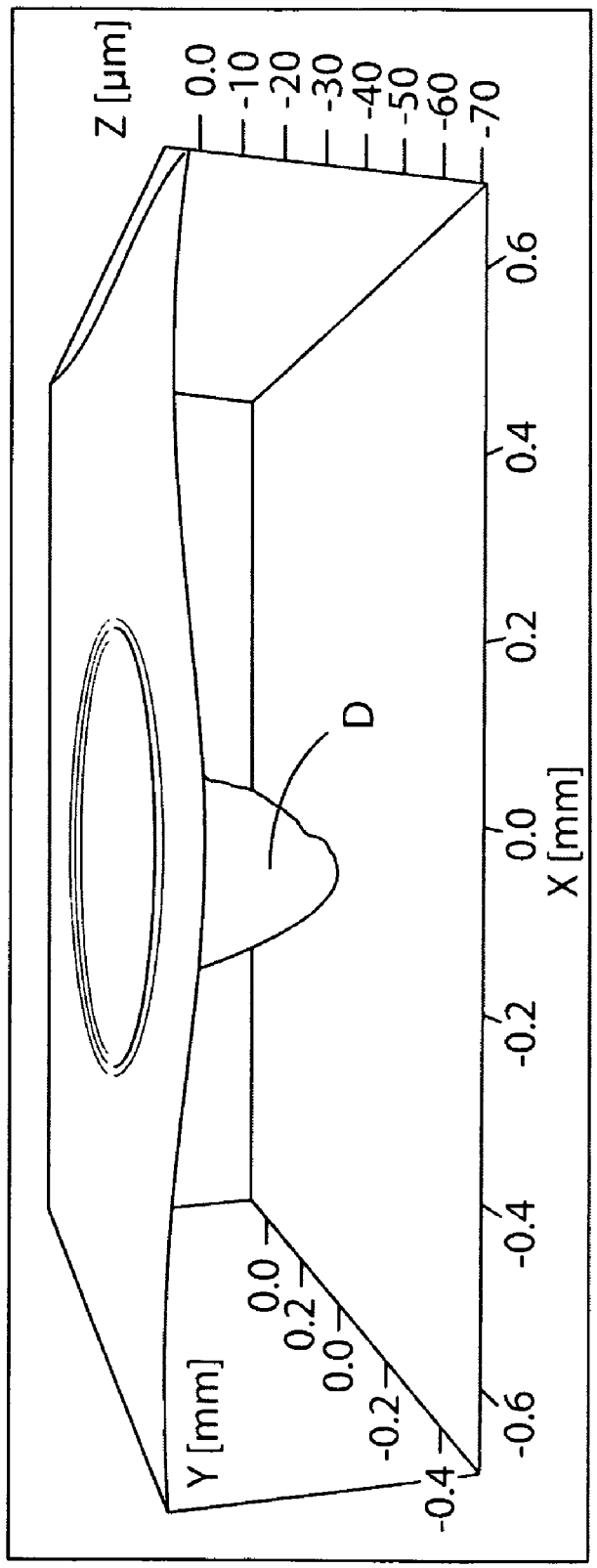
FIG. 5 is a three dimensional representation of a dimple created by a single tool tip sphere pressed in a copper sheet as described in the Example.

The spheres (corresponding to tool tips 12) were arranged in a 7×7 array on a glass slide, using vacuum grease as an adhesive. The average distance between adjacent spheres was approximately 550 μm, as shown in FIG. 4. The glass slide was placed sphere-side-down on top of the copper sheet, with PMMA sheet underneath as the support layer. The PMMA sheet resided on a solid rigid base such as steel plate. The total estimated force required to attain a dimple depth of 82.5 μm was 2269 N; 46.2 N were required for depression of a single sphere from the simulation, of which there were 49 for this experiment. A compression machine was used to load the assembly to a peak load of 2270 N. The resulting surface texture was composed of hemispherical dimples with depths ranging from 60 μm to 75 μm, as shown in FIG. 5 for a single dimple D.

The present invention can be practiced to create various dimple geometries on a variety of sheet materials. The present invention will have applications in the fields of manufacturing, materials processing, and tribology. For purposes of illustration and not limitation, the invention can be practiced to make a patterned sheet material for use in optical displays, as a mask for electrical and/or chemical etching, and as a solid carrier to be used to provide organized wells in which to grow nanotubes, algae or other medium.

Although the invention has been described with respect to certain illustrative embodiments thereof, those skilled in the art will appreciate that changes and modifications can be made thereto without departing from the spirit and scope of the invention as set forth in the appended claims.

REFERENCE

1. Wang, C. J., M. S. Hong, and K. F. Ehmann, *Surface Topography Control in Single-Point Cutting*. S. M. Wu Symposium, 1994. 1.
2. Yao, D. and P. Nagarajan, *Cold Forging Method for Polymer Microfabrication*. Polymer Engineering and Science, 2004. 44(10).
3. Rode, M. and B. Hillerich, *Self-aligned positioning of microoptical components by precision prismatic grooves impressed into metals*. Microelectromechanical Systems, Journal of, 1999. 8(1): p. 58-64.
4. Chou, M. C., et al., *A novel method to fabricate gapless hexagonal micro-lens array*. Sensors and Actuators A: Physical, 2005. 118(2): p. 298-306.
5. Böhm, J., et al., *Micro-metalforming with silicon dies*. Microsystem Technologies, 2001. 7(4): p. 191-195.
6. Pettersson, U. and S. Jacobson, *Influence of surface texture on boundary lubricated sliding contacts*. Tribology International, 2003. 36(11): p. 857-864.
7. Wang, X., et al., *Loads carrying capacity map for the surface texture design of SiC thrust bearing sliding in water*. Tribology International, 2003. 36(3): p. 189-197.
8. Kim, G. M., M. A. F. van den Boogaart, and J. Brugger, *Fabrication and application of a full wafer size micro/nanostencil for multiple length-scale surface patterning*. Microelectronic Engineering, 2003. 67-8: p. 609-614.
9. Smuokov, S. K., et al., *Cutting into Solids with Micropatterned Gels*. Advanced Materials, 2005. 17: p. 1361-1365.
10. Ryk, G., Y. Kligerman, and I. Etsion, *Experimental Investigation of Laser Surface Texturing for Reciprocating Automotive Components*. Tribology Transactions, 2002. 45(4): p. 444-449.
11. Etsion, I. and G. Halperin, *A Laser Surface Textured Hydrostatic Mechanical Seal*. Tribology Transactions, 2002. 45(3): p. 430-434.
12. Brizmer, V., Y. Kligerman, and I. Etsion, *A Laser Surface Textured Parallel Thrust Bearing*. Tribology Transactions, 2003. 46(3): p. 397-403.
13. Etsion, I., *State of the Art in Laser Surface Texturing*. Journal of Tribology, 2005. 127(1): p. 248-253.
14. Geiger, M., U. Popp, and U. Engel, *Excimer laser micro texturing of cold forging tool surfaces—Influence on tool life*. Cirp Annals-Manufacturing Technology, 2002. 51(1): p. 231-234.
15. Etsion, I., *Bearing Having Micropores, and Design Method Therefor*. 2000, Surface Technologies Ltd.
16. Miyakawa, T. and M. Yonekawa, *Laser Texture Processing Apparatus and Method*. 2000, NEC Corporation.
17. Baumgart, P., et al., *A new laser texturing technique for high performance magnetic disk drives*. Magnetics, IEEE Transactions on, 1995. 31(6): p. 2946-2951.
18. Ehmann, K. F., et al., *Micromanufacturing: International Assessment of Research and Development*. 2007: Springer. 396.
19. Haj-Ali-Ahmadi, J., J. A. Frankeny, and K. Hermann, *Variable Array Punch*. 1992, International Business Machines Corporation.
20. Kawanishi, N., et al., *Method for Providing Surface Texture of Aluminum Sheet, Substrate for Lithographic Plat and Lithographic Plate*. 2007, Fuji Photo Film Co., Ltd.

The invention claimed is:
1. A method of reducing pile-up around depressions formed in a sheet material, comprising relatively moving one or more tool tips and the sheet material toward one another to press the one or more tool tips into the sheet material to plastically deform the sheet material to form said depressions, one or more of said depressions having a depth dimension of 5 mm or less, while the sheet material is supported by a support sheet that is thicker than the sheet material and possesses a Young's modulus less than the sheet material, said support sheet reducing pile-up around the depressions as they are formed in the sheet material.

2. The method of claim 1 wherein the depressions form a texture on the sheet material.

3. The method of claim 1 including relatively laterally moving the sheet material and the one or more tool tips after each pressing step to form a depression at another location on the sheet material.

4. The method of claim 1 including pressing a plurality of tool tips arranged in a two dimensional pattern into the sheet material to form a pattern of depressions in the sheet material.

5. The method of claim 1 wherein the Young's modulus of the support sheet is about 5% to 20% of the Young's modulus of the sheet material.

6. The method of claim 1 wherein the support sheet comprises a non-metallic material.

7. The method of claim 1 wherein the support sheet comprises a polymeric material.

8. The method of claim 7 wherein the polymeric material comprises PMMA or PTFE.

9. The method of claim 1 wherein the sheet material has a thickness in the range of 50 micrometers to 1.5 mm.

10. The method of claim 1 wherein the sheet material comprises a metallic sheet.

11. The method of claim 1 wherein the one or more tool tips form one or more depressions having a lateral dimension of 10 mm or less.

12. The method of claim 1 wherein the support sheet comprises a metallic sheet.

13. The method of claim 1 wherein the sheet material comprises a non-metallic sheet.

14. Apparatus for reducing pile-up around depressions as they are formed in a textured-surface on a sheet material, comprising one or more tool tips having a lateral tool tip dimension of 10 mm or less, a base spaced from the one or more tool tips, and a support sheet which is disposed on the base and on which the sheet material is supported, said support sheet being thicker than the sheet material and possessing a Young's modulus less than the sheet material, said one or more tool tips and said sheet material being relatively movable toward one another to press the one or more tool tips into the sheet material to plastically deform the sheet material to form said depressions while it is supported by the support sheet which reduces pile-up around the depressions formed in the sheet material.

15. The apparatus of claim 14 including one or more moving devices for relatively laterally moving the one or more tool tips and sheet material to form a pattern of depressions on the sheet material.

16. The apparatus of claim 14 wherein a plurality of tool tips are arranged in a two dimensional pattern on a side thereof for pressing into the sheet material to form a two dimensional pattern of said depressions in the sheet material.

17. The apparatus of claim 14 wherein the support sheet comprises a non-metallic material.

18. The apparatus of claim 17 wherein the non-metallic material comprises a polymeric material.

19. The apparatus of claim 18 wherein the polymeric material comprises PMMA or PTFE.

20. The apparatus of claim 14 wherein the tool tip has a height dimension of 5 mm or less.

21. The apparatus of claim 14 wherein the support sheet comprises a metallic sheet.

22. The apparatus of claim 14 wherein the Young's modulus of the support sheet is about 5% to 20% of the Young's modulus of the sheet material.

* * * * *